(12) United States Patent
Oyama

(10) Patent No.: US 8,621,192 B2
(45) Date of Patent: Dec. 31, 2013

(54) COMPUTER START-UP SYSTEM, COMPUTER START-UP METHOD, AND COMPUTER START-UP PROGRAM

(75) Inventor: Hiroaki Oyama, Tokyo (JP)

(73) Assignee: NEC Corporation, Tokyo (JP)

( * ) Notice: Subject to any disclaimer, the term of this patent is extended or adjusted under 35 U.S.C. 154(b) by 893 days.

(21) Appl. No.: 12/642,953

(22) Filed: Dec. 21, 2009

(65) Prior Publication Data

US 2010/0161954 A1    Jun. 24, 2010

(30) Foreign Application Priority Data

Dec. 19, 2008   (JP) ................................. 2008-324262

(51) Int. Cl.
*G06F 9/00* (2006.01)
*G06F 9/24* (2006.01)
*G06F 15/177* (2006.01)
*H05K 7/10* (2006.01)

(52) U.S. Cl.
USPC .................................... 713/2; 713/1; 710/301

(58) Field of Classification Search
USPC .......................................... 713/1, 2; 710/301
See application file for complete search history.

(56) References Cited

U.S. PATENT DOCUMENTS

| | | | | |
|---|---|---|---|---|
| 2003/0191931 | A1* | 10/2003 | Yonemura | 713/1 |
| 2004/0133712 | A1* | 7/2004 | Yamamoto et al. | 710/23 |
| 2005/0038986 | A1* | 2/2005 | Agan et al. | 713/2 |
| 2006/0242399 | A1* | 10/2006 | Zimmer et al. | 713/2 |
| 2008/0209096 | A1* | 8/2008 | Lin et al. | 710/301 |

FOREIGN PATENT DOCUMENTS

| | | |
|---|---|---|
| JP | 7-6114 A | 1/1995 |
| JP | 2007148773 A | 6/2007 |

* cited by examiner

*Primary Examiner* — Kim Huynh
*Assistant Examiner* — Brandon Kinsey

(57) ABSTRACT

To start-up a computer system promptly at the time of power-on. The system includes an expansion card having an initialization command set in advance and a main body unit on which the expansion card is mounted. The main body unit includes a central processing section for executing initialization of the expansion card at the time of power-on based on the initialization command, a history holding section for storing the initialized expansion card, and a dictionary section for storing a common command which is the initialization command common to different expansion cards. The central processing section executes the common command, and also executes the initialization command set in the expansion card other than the expansion card stored in the history holding section and not included in the common command.

7 Claims, 8 Drawing Sheets

FIG. 2

| MOUNTED POSITION | TYPE |
|---|---|
| EXPANSION CARD 100 | A |
| EXPANSION CARD 200 | B |
| EXPANSION CARD 300 | A |
| EXPANSION CARD 400 | C |

FIG. 3

| GROUP | TYPE |
|---|---|
| 1 | B,C |

FIG. 4

| TIME | EXECUTION HISTORY |
|---|---|
| 0 | -- |
| 1 | A |
| 2 | A,1 |
| 3 | A,1 |
| 4 | A,1 |

FIG. 6

| MOUNTED POSITION | TYPE |
|---|---|
| EXPANSION CARD 100 | A |
| EXPANSION CARD 200 | B |
| EXPANSION CARD 300 | C |
| EXPANSION CARD 400 | D |
| EXPANSION CARD 500 | B |
| EXPANSION CARD 600 | C |
| EXPANSION CARD 700 | A |
| EXPANSION CARD 800 | D |

FIG. 7

| GROUP | TYPE |
|-------|------|
| 1     | A,B  |

FIG. 8

| TIME | EXECUTION HISTORY |
|---|---|
| 0 | --- |
| 1 | 1 |
| 2 | 1 |
| 3 | 1,C |
| 4 | 1,C,D |
| 5 | 1,C,D |
| 6 | 1,C,D |
| 7 | 1,C,D |
| 8 | 1,C,D |

COMPUTER START-UP SYSTEM, COMPUTER START-UP METHOD, AND COMPUTER START-UP PROGRAM

CROSS-REFERENCE TO RELATED APPLICATION

This application is based upon and claims the benefit of priority from Japanese patent application No. 2008-324262, filed on Dec. 19, 2008, the disclosure of which is incorporated herein in its entirety by reference.

BACKGROUND OF THE INVENTION

1. Field of the Invention

The present invention relates to an initializing system of a computer at a time of power-on of the computer, and, more particularly, to an initializing system of an expansion card mounted on the computer.

2. Description of the Related Art

An initializing program (ROM program) stored in a ROM (Read Only Memory) mounted on the expansion card is read out from the expansion card connected to a computer main body device (hereinafter called "main body device") and the program is executed, at a time of start-up operation of the main body device (at the time of power-on). With this, operational states of the expansion card, peripheral devices connected to the expansion card, and the like are initialized.

The execution processing of the initializing program is executed by each expansion card unit connected to the main body device in order. Therefore, for a server with a large scale configuration having a number of expansion cards mounted on the main body device for example, there has been such a disadvantage that, at the time of start-up operation of the server main body, initialization processing of each expansion card takes a very long time, and therefore, a very long time is required for starting-up the main body device.

Particularly, when the initialization is executed by recognizing the expansion card which has a plurality of programs in a ROM on the expansion card, an appropriate setting about whether to execute the ROM program of each expansion card is required by expansion slot unit, in order to achieve a prompt start-up operation of the main body device with a necessary minimum time.

However, for the appropriate setting about whether to execute the ROM program of each expansion card, the setting has to be performed according to mounting configuration of the expansion card such as mounted position of the expansion card or the type of the expansion card. Thus, there has been such a disadvantage that content of the setting becomes complicated.

Also, with a large scale configuration having a number of expansion cards mounted thereon, there has been such a disadvantage that a very long time is required for start-up operation since the ROM programs are executed on all the expansion cards at the start-up operation.

As a related art dealing with the problems described above, proposed is a method with which the setting about whether to execute the ROM program on each expansion card is performed manually by each unit of mounting slot for the expansion card, to execute the required minimum number of ROM programs, in order to shorten the start-up time (Japanese Unexamined Patent Publication 07-006114 (Patent Document 1)).

However, with the related art described in Patent Document 1, since the mounted position of the expansion card varies according to each shipping configuration of the computer main body device, the setting in accordance with each configuration of the main body devices is required, and there has been such a disadvantage that the procedure cannot be fixed, and becomes complicated.

SUMMARY OF THE INVENTION

It is an exemplary object of the invention to provide a computer start-up system, a computer start-up method, and a computer start-up program for speeding up the start-up operation of the computer system at the time of power-on.

In order to achieve the foregoing object, a computer start-up system according to an exemplary aspect of the invention is a computer start-up system including an expansion card in which an initialization command is set in advance and a main body unit on which the expansion card is mounted, where the main body unit has an initialization executing device for performing execution processing to initialize the expansion card at the time of power-on of the main body unit based on the initialization command. The main body unit includes: a common command storing device for storing a common command set in advance as an initialization command that is common to expansion cards of a specific card type; an execution processing control device for having the initialization executing device execute the common command; and a history information storing device for storing card identification information that indicates an initialized state of the expansion card, where the execution processing control device has an initialization execution control function for having the initialization executing device execute the initialization command to initialize an expansion card whose card type is different from the specific card type, once for each card type.

Further, a computer start-up method according to another exemplary aspect of the invention is a start-up method for a computer that includes an expansion card in which an initialization command is set in advance and a main body unit to which the expansion card is mounted, where the main body unit has an initialization executing device for executing the initialization command to initialize the expansion card. The method includes: executing a common command set in advance as an initialization command common to different expansion cards mounted on the main body unit at a time of power-on of the main body unit; executing an initialization command not included in the common command; storing the expansion card initialized by executing the initialization command; and executing an initialization command of an expansion card other than the stored expansion card.

Furthermore, a computer start-up program according to still another exemplary aspect of the invention is a start-up program for a computer that includes an expansion card in which an initialization command is set in advance and a main body unit to which the expansion card is mounted, where the main body unit has an initialization executing device for executing the initialization command to initialize the expansion card. The program causes a computer provided to the main body unit to execute: a common command execution processing function for executing a common command set in advance as an initialization command common to different expansion cards mounted on the main body unit, at a time of power-on of the main body unit; an initialization command execution processing function for executing an initialization command not included in the common command; and an uninitialized card initialization execution function for executing an initialization command of an expansion card other than the expansion card initialized by executing the initialization command.

BRIEF DESCRIPTION OF THE DRAWINGS

FIG. 2 is an explanatory illustration showing a card type of an expansion card in the computer start-up system disclosed in FIG. 1;

Figure 3:
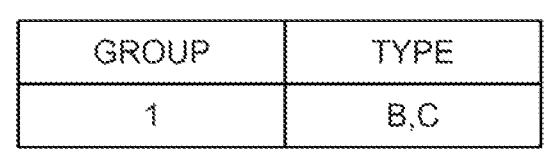

FIG. 3 is an explanatory illustration showing a group that is set by each card type of the expansion card in the computer start-up system disclosed in FIG. 1;

FIG. 4 is an explanatory illustration showing an execution history table in the computer start-up system disclosed in FIG. 1;

FIG. 6 is an explanatory illustration showing a card type of an expansion card in the computer start-up system disclosed in FIG. 5;

Figure 7:
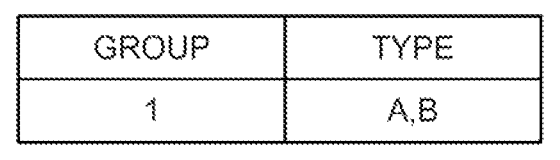

FIG. 7 is an explanatory illustration showing a group that is set by each card type of the expansion card in the computer start-up system disclosed in FIG. 5; and FIG. 8 is an explanatory illustration showing an execution history table in the computer start-up system disclosed in FIG. 5.

DETAILED DESCRIPTION OF THE EXEMPLARY EMBODIMENTS

First Exemplary Embodiment

Next, a basic configuration of a computer start-up system according to an exemplary embodiment of the invention will be explained.

Figure 1:
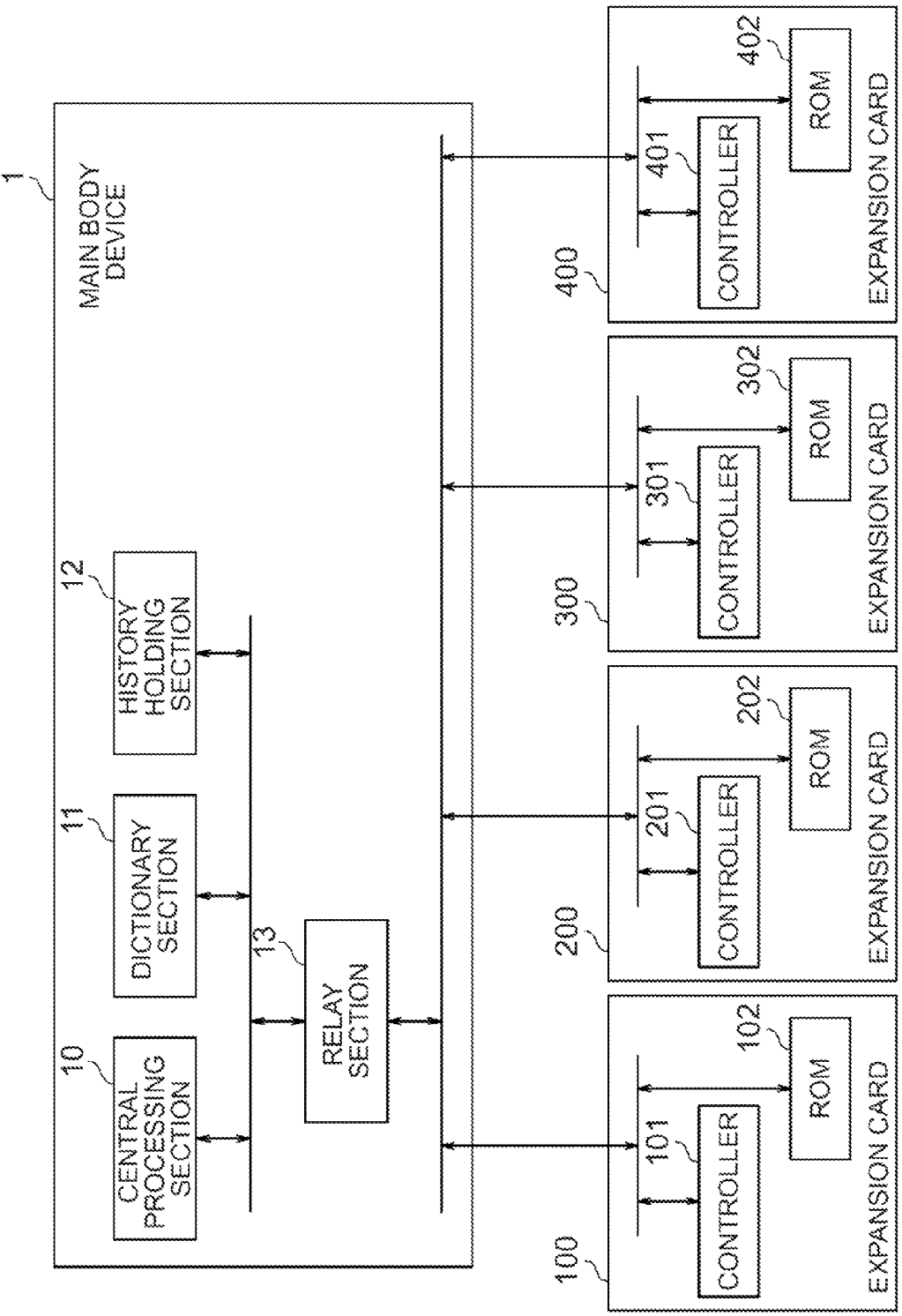
FIG. 1 is a schematic block diagram showing an exemplary embodiment of a computer start-up system according to the invention.

The computer start-up system according to a first exemplary embodiment has a configuration including, as shown in FIG. 1: a main body device 1 that is a computer having a connecting unit for expansion such as an expansion slot; and expansion cards 100, 200, 300, and 400, connected to connection buses arranged in the main body device 1 in advance, for functioning as external connection devices for the main body device 1.

The main body device 1 includes: a central processing section 10 for performing entire operational control of an operation unit set in the main body device 1; a dictionary section 11 for storing information set in advance; a history holding section 12 for storing history information about initialization processing for each of the expansion cards (100-400) connected to the main body device 1; and a relay section 13, connected to the central processing section 10 via the connection bus arranged in the main body device 1 in advance, for relaying mutual information communication performed between the central processing section 10 and the expansion cards (100-400).

Here, it is assumed that the main body device 1 is a computer including a CPU (central processing unit), a memory serving as a storing device, an HDD (hard disc drive), and the like, wherein the CPU performs the execution processing based on a control program set in advance in the HDD or the like, to achieve a processing operation in the central processing section 10 and the relay section 13, and a control of data read/write from/to the dictionary section 11 and the history holding section 12.

The central processing section 10 has: a card recognition processing function for performing a connection authentication for each expansion card by communicating with the expansion card connected to the main body device 1 via the relay section 13; an execution judging function for judging whether it is necessary to execute a ROM program set on each expansion card; and a starting command execution function for executing the ROM program on each expansion card when it is judged that execution of the ROM program is necessary.

Also, the central processing section 10 has a dictionary checking function for referring to the dictionary section 11 based on card identification information indicating a card type of each expansion card obtained from each of the expansion cards, and checking whether card type information is registered in the dictionary section 11, at a time of authentication processing (a time of executing the card recognition processing function).

Further, the central processing section 10 has a history referring function for obtaining information about the card type from a targeted expansion card, and referring to the history holding section 12 based on the information, when the card type checked as described above is not registered in the dictionary section 11.

Note that the central processing section 10 searches and authenticates the expansion cards 100-400 in order (expansion card searching function). Here, it is assumed that this search is performed in ascending order of numbers.

The dictionary section 11 is an information storing section having a group information storing function for storing an initialization program (common ROM program) which is common to the expansion cards performing a same type of operational function and card types set to be a group by a specific criteria, based on identification information set in advance in the ROM on each expansion card.

The history holding section 12 is a storing section for storing an execution history table (FIG. 4) showing a history of the executed ROM program of the expansion card connected to the main body device 1.

Figure 4:
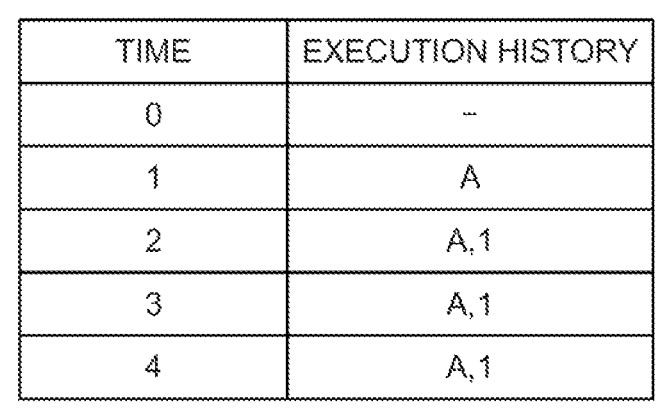

Note that the execution history table is table information showing the card type for which the initialization program is executed, and also showing on which timing the program is executed for the group of the expansion cards, as shown in FIG. 4.

The expansion cards 100, 200, 300, and 400 are the expansion cards mounted on the main body device 1.

The expansion cards 100, 200, 300, and 400 have similar configuration respectively. Although an internal configuration of the expansion card 100 is explained here, it is assumed that the expansion cards 200, 300, and 400 also have similar internal configurations.

The expansion card 100 is configured by including a controller 101 for controlling a communication with the central processing section 10 and a ROM 102 for storing the initialization program.

Note that the operational function of the expansion card is initialized when the ROM program is executed by the main body device 1 side (central processing section 10), and the expansion card functions as an expansion device of the main body device.

Also, the first exemplary embodiment is configured to mount: two expansion cards classified in card type A, i.e., the expansion card 100 and the expansion card 300; the expansion card 200 classified in card type B; and the expansion card 400 classified in card type C.

Explanation of Operation in First Exemplary Embodiment

Next, an outline of an operation of the entire first exemplary embodiment will be described. The central processing section 10 executes the common command set in advance in the dictionary section 11 as the initialization command common to different expansion cards (100-400) mounted on the main body device 1 at the time of power-on of the main body device 1, executes the initialization command (initialization program) of the expansion card which is not included in the common command, stores the expansion card initialized by the execution of the initialization program, and executes the initialization command to initialize the expansion card other than the stored expansion card.

Note that the computer provided to the main body device 1 may be set to execute: a common command execution processing function for executing the common command set in advance as an initialization program, which is set commonly to different expansion cards mounted on the main body device, at a time of power-on for the main body device; an initialization command execution processing function for executing an initialization program not included in the common command; and an uninitialized card initialization execution function for executing an initialization command of an expansion card other than the expansion card initialized by executing the initialization program.

Here, an operation at time "0" shown in FIG. 4 will be outlined.

The time "0" shows an initial state of an input/output control system including the main body device 1 and the expansion cards 100-400. In this case, it is assumed that none of the ROM programs on the expansion cards 100-400 is executed. Also, it is assumed that the execution history information is not registered in the history holding section 12 (execution history table) at this time.

When a start-up operation (power-on) is performed for an expansion unit control system from this state, the central processing section 10 recognizes the expansion card 100 via the relay section 13, then judges whether it is necessary to execute the ROM program on the expansion card 100, and when it is judged that the execution is necessary, executes the ROM program on the expansion card.

Next, the operation at the time "0" will be described in detail.

First, the central processing section 10 accesses to the expansion card 100 via the relay section 13 and obtains the card type information indicating the card type of the expansion card 100 (card type A) from the controller 101 of the expansion card 100. With this, the central processing section 10 recognizes that the expansion card 100 is being connected to the main body device (expansion card recognition processing).

Next, after recognizing the expansion card 100, the central processing section 10 checks whether the card type A is registered in the dictionary section 11 in advance, by referring to the dictionary section 11 based on the card type A.

In this case, information about the card type A is not registered in the dictionary section 11, so the central processing section 10 checks whether the card type A is registered in the history holding section 12 as execution history information, by referring to the history holding section 12 based on the card type A.

Since the information indicating the card type A is not registered in the history holding section 12 at this time, the central processing section 10 determines (judges) that it is necessary to execute the ROM program on the expansion card 100.

Then, the central processing section 10 registers the card type A in the execution history table (FIG. 4) of the history holding section 12 as the expansion card whose ROM program is executed.

Note that the exemplary embodiment may be set such that, when it is notified to the expansion card 100 that the card type A is not registered in the history holding section 12, the controller 101 of the expansion card 100 accesses to the history holding section 12 via the relay section 13 and registers the card type A in the history holding section 12 (execution history table).

With this, processing load applied to the central processing section 10 at the time of start-up operation of the main body device 1 is reduced, and the start-up operation can be speeded up. Then, the central processing section 10 executes the ROM program on the expansion card 100.

Next, at time "1" shown in FIG. 4, the card type A which is the card type of the expansion card 100 whose ROM program is executed previously is recorded in the history information table as the execution history information.

Here, the central processing section 10 recognizes the expansion card 200 (recognition processing), judges whether it is necessary to execute the ROM program on the expansion card 200, and when it is judged that the execution is necessary, executes the ROM program on the expansion card 200.

Hereinafter, the operation at the time "1" will be described in detail.

First, after performing authentication processing of the expansion card 200, the central processing section 10 checks whether the card type information indicating the card type of the expansion card 200 (card type B) is registered in the dictionary section 11, by referring to the dictionary section 11 based on information obtained at the authentication processing (card identification information).

In this case, the card type B is registered in the dictionary section 11 as group 1. Therefore, the central processing section 10 checks whether the ROM program corresponding to the card type B, that is, the ROM program on the expansion card 200 has been executed, by referring to the history holding section 12 based on group information 1 which is registration content of the registered group 1 (including the card type B).

As described above, only the card type A is registered in the history holding section 12 (execution history table) as the execution history information at this time. Therefore, the central processing section 10 judges that it is necessary to execute the ROM program on the expansion card 200 (execution judging step).

Next, the central processing section 10 registers the group information 1 to the execution history table (FIG. 4) of the history holding section 12 as the execution history information. Then, the central processing section 10 executes the ROM program on the expansion card 200.

Next, at time "2" shown in FIG. 4, the card type A and the group information 1 of the expansion card whose ROM program is executed previously are recorded in the history information table of the history holding section 12 as the execution history information. Here, the central processing section 10 recognizes the expansion card 300 (recognition processing), judges whether it is necessary to execute the ROM program on the expansion card 300, and when it is judged that the execution is necessary, executes the ROM program on the expansion card 300.

Hereinafter, the operation at the time "2" will be described in detail.

First, after performing authentication processing of the expansion card 300, the central processing section 10 checks whether the card type information indicating the card type of the expansion card 300 (card type A) is registered in the dictionary section 11, by referring to the dictionary section 11 based on information obtained at the authentication processing (card identification information).

In this case, the card type A is not registered in the dictionary section 11, so the central processing section 10 checks whether the card type A is registered in the history holding section 12, by referring to the history holding section 12 based on the information (card type A) obtained from the expansion card 300.

At this time, the card type A and the group information 1 are recorded in the history holding section 12 (execution history table) as the execution history information.

In this case, since the card type A has been recorded in the execution history table already, the central processing section 10 judges that the ROM program on the expansion card 300 (card type A) has been executed and there is no need to execute the program (execution judging step).

Here, the central processing section 10 judges that there is no need to execute the ROM program on the expansion card 300, so the execution history information is not registered in the history holding section 12 and also the ROM program on the expansion card 300 is not executed.

Next, an operation at time "3" shown in FIG. 4 will be outlined.

At the time "3," the card type A and the group information 1 of the expansion card whose ROM program is executed previously is recorded in the history information table of the history holding section 12 as the execution history information.

Here, the central processing section 10 recognizes the expansion card 400 (recognition processing), judges whether it is necessary to execute the ROM program on the expansion card 400, and when it is judged that the execution is necessary, executes the ROM program. Hereinafter, the operation at the time "3" will be described in detail.

First, after performing authentication processing of the expansion card 400, the central processing section 10 checks whether the card type information indicating the card type of the expansion card 400 (card type C) is registered in the dictionary section 11, by referring to the dictionary section 11 based on information (card type C) obtained at the authentication processing.

In this case, the card type C is registered in the dictionary section 11 as group 1. Therefore, the central processing section 10 checks whether the ROM program corresponding to the card type C, that is, the ROM program on the expansion card 400 has been executed, by referring to the history holding section 12 based on group information 1 which is registration content of the group 1.

At this time, the card type A and the group information 1 are recorded in the history holding section 12 (execution history table) as the execution history information.

In this case, since the group information 1 including the card type C is recorded already in the execution history table, the central processing section 10 judges that the ROM program on the expansion card 400 (card type C) has been executed and there is no need to execute the program (execution judging step).

Also, since the central processing section 10 judges that there is no need to execute the ROM program on the expansion card 400, the execution history information is not registered in the history holding section 12 and also the ROM program on the expansion card 400 is not executed.

Time "4" shows a state in which search of all the expansion cards 100-400 mounted on the main body device is completed accompanying to the start-up operation of the main body device 1 (FIG. 4).

At this time, since the card type A and the group information 1 are registered in the history holding section 12, it is indicated that the ROM program on the expansion card is read and executed once for each of the card type A and the group information 1, i.e., twice in total. As described, in the first exemplary embodiment, by executing the initialization program set in the ROM once for each of the card type and the group of the card types, the initialization of the expansion card connected to the main body device 1 can be achieved with a required minimum number of executions. With this, the start-up time of the main body device 1 can be shortened.

Also, the start-up operation with which the number of executions of the ROM program on the expansion card is limited to a required minimum number can be achieved according to various types of expansion cards mounted on the main body device (main body unit) without special settings according to device structures.

Further, by providing the dictionary section having a common initialization program, an execution control of the initialization program can be achieved flexibly according to the mount structure of various types of expansion cards.

As an exemplary advantage according to the invention, the present invention includes a history storing section that stores an initialized expansion card and a common command storing section that stores a common command which is an initialization command set commonly for different expansion cards, where a central processing section includes an execution processing control unit that executes the common command and also executes an initialization command, which is not included in the common command, set in the expansion card other than the expansion card stored in the history storing unit; with this, the computer system can be started up promptly at the time of power-on.

Second Exemplary Embodiment

Next, a second exemplary embodiment according to the invention will be explained.

Figure 5:
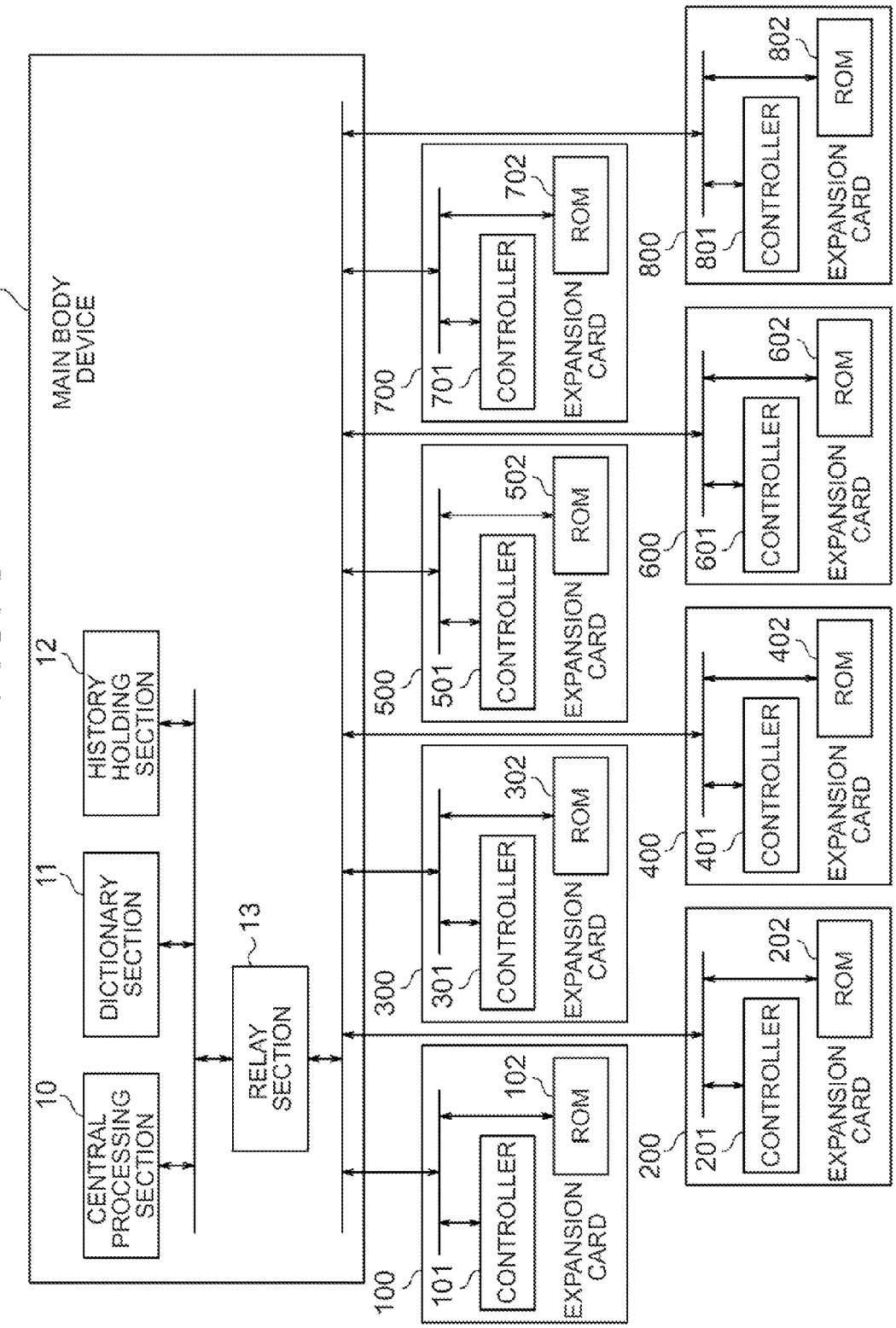
FIG. 5 is a schematic block diagram showing another exemplary embodiment of a computer start-up system according to the invention.

Configuration of the system of the second exemplary embodiment is almost the same as that of the first exemplary embodiment (FIG. 1), and a feature different from the first exemplary embodiment is that expansion cards 500, 600, 700, and 800 are newly connected to the main body device 1 as shown in FIG. 5.

Note that same reference numerals are used for the same structural parts as those of the exemplary embodiment described above Next, a basic configuration of the second exemplary embodiment of the invention will be explained.

The computer start-up system according to the second exemplary embodiment has a configuration including, as shown in FIG. 5: a main body device 1 which is a computer having a connecting unit for expansion such as an expansion slot; and expansion cards 100, 200, 300, 400, 500, 600, 700, and 800 connected to connection buses arranged in the main body device 1 in advance, for functioning as external connection devices for the main body device 1.

The main body device 1 includes: a central processing section 10 for performing entire operational control of an operation unit set in the main body device 1; a dictionary section 11 for storing information set in advance; a history holding section 12 for storing history information about initializing processing for each expansion card (100-400) connected to the main body device 1; and a relay section 13, connected to the central processing section 10 via the connection bus arranged in the main body device 1 in advance, for relaying mutual information communication performed between the central processing section 10 and the expansion cards (100-800).

Here, it is assumed that the main body device 1 is a computer including a CPU, a memory serving as a storing device, an HDD, and the like, wherein the CPU performs the execution processing based on a control program set in advance in the HDD or the like, to achieve a processing operation in the central processing section 10 and the relay section 13, and a control of data read/write from/to the dictionary section 11 and the history holding section 12.

The central processing section 10 has: a card recognition processing function for performing a connection authentication for each expansion card by communicating with the expansion card connected to the main body device 1 via the relay section 13; an execution judging function for judging whether it is necessary to execute a ROM program set on each expansion card; and a starting command execution function for executing the ROM program set on each expansion card when it is judged that execution of the ROM program is necessary.

Also, the central processing section 10 has a dictionary checking function for referring to the dictionary section 11 based on card identification information indicating a card type of each expansion card, obtained from each of the expansion cards, and checking whether card type information is registered in the dictionary section 11, at a time of authentication processing (a time of executing the card recognition processing function).

Further, the central processing section 10 has a history referring function for obtaining information about the card type from a targeted expansion card, and referring to the history holding section 12 based on the information, when the card type checked as described above is not registered in the dictionary section 11.

Note that the central processing section 10 searches and authenticates the expansion cards 100-800 in order (expansion card searching function). Here, it is assumed that this search is performed in ascending order of numbers.

The dictionary section 11 is an information storing section having a group information storing function for storing an initialization program (common ROM program) which is common to the expansion cards performing a same type of operational function and card types set to be a group by a specific criteria, based on identification information set in advance in the ROM on each expansion card.

The history holding section 12 is a storing section for storing an execution history table (FIG. 8) showing a history of the executed ROM program of the expansion card connected to the main body device 1.

Note that the execution history table is table information showing the card type for which the initialization program is executed, and also showing on which timing the program is executed for the group of the expansion cards, as shown in FIG. 8.

The expansion cards 100, 200, 300, 400, 500, 600, 700, and 800 are the expansion cards mounted on the main body device 1.

The expansion cards have similar configuration respectively. Although an internal configuration of the expansion card 100 is explained here, it is assumed that the expansion cards 200-800 have similar internal configurations.

The expansion card 100 is configured by including a controller 101 for controlling a communication with the central processing section 10 and a ROM 102 for storing the initialization program.

Note that the operational function of the expansion card is initialized when the ROM program is executed on the main body device 1 side (central processing section 10), and the expansion card functions as an expansion device of the main body device.

Also, the second exemplary embodiment is configured such that the main body device 1 mounts, as shown in FIG. 6: expansion cards classified in card type A, i.e., the expansion card 100 and the expansion card 700; the expansion cards 200 and 500 classified in card type B; the expansion cards 300 and 600 classified in card type C; and the expansion cards 400 and 800 classified in card type D.

Explanation of Operation in Second Exemplary Embodiment

Next, an operation of the entire second exemplary embodiment will be described based on an execution history table (FIG. 8) stored in a history holding section 12. The execution history table shows transition of registration contents of execution history information stored in the history holding section 12 in chronological order.

Here, an operation at a time "0" shown in FIG. 8 will be outlined.

The time "0" shows an initial state of a computer control system including the main body device 1 and the expansion cards 100-800. In this case, it is assumed that none of the ROM programs set on the expansion cards 100-800 is executed. Also, it is assumed that the execution history information is not registered in the history holding section 12 (execution history table) at this time.

When a start-up operation of a computer start-up system (power-on for the main body device 1) is performed from this state, the central processing section 10 recognizes the expansion card 100 via the relay section 13, then judges whether it is necessary to execute the ROM program on the expansion card 100, and when it is judged that the execution is necessary, executes the ROM program on the expansion card.

Next, the operation at the time "0" will be described in detail.

First, the central processing section 10 accesses to the expansion card 100 via the relay section 13 and obtains the card type information indicating the card type of the expansion card 100 (card type A) from the controller 101 of the expansion card 100. With this, the central processing section 10 recognizes that the expansion card 100 is being connected to the main body device 1 (expansion card recognition processing).

Next, after recognizing the expansion card 100, the central processing section 10 checks whether the card type A is registered in the dictionary section 11 in advance, by referring to the dictionary section 11 based on the card type A.

In this case, the card type A is registered in the dictionary section 11 as group 1; so the central processing section 10 obtains group information 1 (including the card type A) indicating registration contents of the registered group 1, from the dictionary section 11, and checks whether the card type A is registered in the history holding section 12 as execution history information, by referring to the history holding section 12 based on the group information 1.

When the card type A is registered in the history holding section 12, it is judged that the ROM program corresponding to the card type A, that is, the ROM program of the expansion card 100 has been executed.

Since the information indicating the card type A is not registered in the history holding section 12 at this time, the central processing section 10 judges that it is necessary to execute the ROM program on the expansion card 100.

Then, the central processing section 10 registers the card type A in the execution history table (FIG. 8) of the history holding section 12 as the card type whose ROM program has been executed.

Note that the exemplary embodiment may be set such that, when it is notified to the expansion card 100 that the card type A is not registered in the history holding section 12, the controller 101 of the expansion card 100 accesses to the history holding section 12 via the relay section 13 and registers the card type A in the history holding section 12 (execution history table).

With this, processing load applied to the central processing section 10 at the time of start-up operation of the main body device 1 is reduced, and the start-up operation can be speeded up.

Then, the central processing section 10 executes the ROM program set in the expansion card 100.

Next, at time "1" shown in FIG. 8, the card type A which is the card type of the expansion card 100 whose ROM program is executed previously is recorded in the history information table as the execution history information.

Here, the central processing section 10 recognizes the expansion card 200 (recognition processing), judges whether it is necessary to execute the ROM program on the expansion card 200, and when it is judged that the execution is necessary, executes the ROM program on the expansion card 200.

Hereinafter, the operation at the time "1" will be described in detail.

First, after performing authentication processing of the expansion card 200, the central processing section 10 checks whether the card type information indicating the card type of the expansion card 200 (card type B) is registered in the dictionary section 11, by referring to the dictionary section 11 based on information obtained at the authentication processing (card identification information).

In this case, the card type B is registered in the dictionary section 11 as group 1. Therefore, the central processing section 10 obtains group information 1 which is registration content of the registered group 1 (including the card type B), and checks whether the ROM program corresponding to the card type B, that is, the ROM program on the expansion card 200, has been executed, by referring to the history holding section 12 based on the group information 1.

As described above, the group 1 is registered in the history holding section 12 (execution history table) as the execution history information at this time. Since the group 1 includes the card type B which is the card type of the expansion card 200, the central processing section 10 judges the card type B as the card type whose program has been executed already, and therefore, judges that it is not necessary to execute the ROM program of the expansion card 200 (card type B).

With this, the ROM program of the expansion card 200 is not executed here.

Next, at time "2" shown in FIG. 8, the group 1 whose ROM program is executed previously is recorded in the history information table as the execution history information.

Here, the central processing section 10 recognizes the expansion card 300 (recognition processing), judges whether it is necessary to execute the ROM program on the expansion card 300, and when it is judged that the execution is necessary, executes the ROM program on the expansion card 300.

Hereinafter, the operation at the time "2" will be described in detail.

First, after performing authentication processing of the expansion card 300, the central processing section 10 checks whether the card type information indicating the card type of the expansion card 300 (card type C) is registered in the dictionary section 11, by referring to the dictionary section 11 based on information obtained at the authentication processing (card identification information).

In this case, the card type C is not registered in the dictionary section 11; so the central processing section 10 obtains information about the card type C from the expansion card 300, and refers to the history holding section 12 based on the information.

At this time, only the group 1 is registered in the history holding section 12 (execution history table) as the execution history information. Since the card type C is not included in the group 1, the central processing section 10 judges that it is necessary to execute the ROM program of the expansion card 300 (card type C).

In this case, the card type C is not registered in the dictionary section 11. Therefore, the central processing section 10 registers the obtained information about the card type C into the history holding section 12 (execution history table), and executes the ROM program set on the expansion card 300 (card type C).

Next, at time "3" shown in FIG. 8, the group 1 and the card type C for which the common ROM program is executed previously are recorded in the history information table (history holding section 12) as the execution history information.

Here, the central processing section 10 recognizes the expansion card 400 (recognition processing), judges whether it is necessary to execute the ROM program set on the expansion card 400, and when it is judged that the execution is necessary, executes the ROM program on the expansion card 400.

Hereinafter, the operation at the time "3" will be described in detail.

First, after performing authentication processing of the expansion card 400, the central processing section 10 checks whether the card type information indicating the card type of the expansion card 400 (card type D) is registered in the dictionary section 11, by referring to the dictionary section 11 based on information obtained at the authentication processing (card identification information).

In this case, the card type D is not registered in the dictionary section 11; so the central processing section 10 obtains information about the card type D from the expansion card 400, and refers to the history holding section 12 based on the information.

At this time, the group 1 and the card type C are registered in the history holding section 12 (execution history table) as the execution history information. Since the card type D is not included in the group 1, the central processing section 10 judges that it is necessary to execute the ROM program of the expansion card 400 (card type D).

In this case, the card type D is not registered in the dictionary section 11. Therefore, the central processing section 10 registers the obtained information about the card type D into the history holding section 12 (execution history table), and executes the ROM program set on the expansion card 400.

Next, at time "4" shown in FIG. 8, the group 1 and the card types C and D for which the common ROM program is executed previously are recorded in the history information table (history holding section 12) as the execution history information.

Here, the central processing section 10 recognizes the expansion card 500 (recognition processing), judges whether it is necessary to execute the ROM program set on the expansion card 500, and when it is judged that the execution is necessary, executes the ROM program on the expansion card 500.

Hereinafter, the operation at the time "4" will be described in detail.

First, after performing authentication processing of the expansion card 500, the central processing section 10 checks whether the card type information indicating the card type of the expansion card 500 (card type B) is registered in the dictionary section 11, by referring to the dictionary section 11 based on information obtained at the authentication processing (card identification information).

In this case, the card type B is registered in the dictionary section 11 as group 1. Therefore, the central processing section 10 obtains group information 1 which is registration content of the registered group 1 (including the card type B), and checks whether the ROM program corresponding to the card type B, that is, the ROM program on the expansion card 500, has been executed, by referring to the history holding section 12 based on the group information 1.

As described above, the group 1 and the card types C and D are registered in the history holding section 12 (execution history table) as the execution history information at this time. Since the group 1 includes the card type B which is the card type of the expansion card 500, the central processing section 10 judges the card type B as the card type whose program has been executed already, and therefore, judges that it is not necessary to execute the ROM program of the expansion card 500 (card type B).

With this, the ROM program of the expansion card 500 is not executed here.

Next, at time "5" shown in FIG. 8, the group 1 and the card types C and D for which the common ROM program is executed previously are recorded in the history information table (history holding section 12) as the execution history information.

Here, the central processing section 10 recognizes the expansion card 600 (recognition processing), judges whether it is necessary to execute the ROM program set on the expansion card 600, and when it is judged that the execution is necessary, executes the ROM program on the expansion card 600.

Hereinafter, the operation at the time "5" will be described in detail.

First, after performing authentication processing of the expansion card 600, the central processing section 10 checks whether the card type information indicating the card type of the expansion card 600 (card type C) is registered in the dictionary section 11, by referring to the dictionary section 11 based on information obtained at the authentication processing (card identification information).

In this case, the card type C is not registered in the dictionary section 11; so the central processing section 10 obtains information about the card type C from the expansion card 600, and refers to the history holding section 12 based on the information.

As described above, the group 1 and the card types C and D are registered in the history holding section 12 (execution history table) as the execution history information at this time. Therefore, the central processing section 10 judges the card type C as the card type whose program has been executed already, and judges that it is not necessary to execute the ROM program of the expansion card 600 (card type C).

With this, the ROM program of the expansion card 600 is not executed here. Next, at time "6" shown in FIG. 8, the group 1 and the card types C and D for which the common ROM program is executed previously are recorded in the history information table (history holding section 12) as the execution history information.

Here, the central processing section 10 recognizes the expansion card 700 (recognition processing), judges whether it is necessary to execute the ROM program set on the expansion card 700, and when it is judged that the execution is necessary, executes the ROM program on the expansion card 700.

Hereinafter, the operation at the time "6" be described in detail.

First, after performing authentication processing of the expansion card 700, the central processing section 10 checks whether the card type information indicating the card type of the expansion card 700 (card type A) is registered in the dictionary section 11, by referring to the dictionary section 11 based on information obtained at the authentication processing (card identification information).

In this case, the card type A is registered in the dictionary section 11 as group 1. Therefore, the central processing section 10 obtains group information 1 which is registration content of the registered group 1 (including the card type A), and checks whether the ROM program corresponding to the card type A, that is, the ROM program on the expansion card 700, has been executed, by referring to the history holding section 12 based on the group information 1.

As described above, the group 1 and the card types C and D are registered in the history holding section 12 (execution history table) as the execution history information at this time. Since the group 1 includes the card type A which is the card type of the expansion card 700, the central processing section 10 judges the card type A as the card type whose program has been executed already, and therefore, judges that it is not necessary to execute the ROM program of the expansion card 700 (card type A).

With this, the ROM program of the expansion card 700 is not executed here.

Next, at time "7" shown in FIG. 8, the group 1 and the card types C and D for which the common ROM program is executed previously are recorded in the history information table (history holding section 12) as the execution history information.

Here, the central processing section 10 recognizes the expansion card 800 (recognition processing), judges whether it is necessary to execute the ROM program set on the expansion card 800, and when it is judged that the execution is necessary, executes the ROM program on the expansion card 800.

Hereinafter, the operation at the time "7" will be described in detail.

First, after performing authentication processing of the expansion card 800, the central processing section 10 checks whether the card type information indicating the card type of the expansion card 800 (card type D) is registered in the dictionary section 11, by referring to the dictionary section 11 based on information obtained at the authentication processing (card identification information).

In this case, the card type D is not registered in the dictionary section 11; so the central processing section 10 obtains information about the card type D from the expansion card 800, and refers to the history holding section 12 based on the information.

As described above, the group 1 and the card types C and D are registered in the execution history table of the history holding section 12 as the execution history information at this time. Therefore, the central processing section 10 judges the card type D as the card type whose program has been executed already, and judges that it is not necessary to execute the ROM program of the expansion card 800 (card type D).

With this, the ROM program of the expansion card 800 is not executed here.

Next, at time "8" shown in FIG. 8, a state in which search of all the expansion cards 100-800 mounted on the main body device is completed is shown.

At this time, the group 1 and the card types C and D are registered in the history holding section 12. It means that the ROM program on the expansion card is executed once for each of the group 1 and the card types C and D, i.e., three times in total.

As described, in the second exemplary embodiment, as well as in the first exemplary embodiment, by executing the ROM program on the expansion card based on the card type and the group set in advance, the initialization of the expansion card connected to the main body device can be achieved with a required minimum number of executions. With this, the start-up time of the main body device can be shortened effectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to the computer system such as a large scale server device to which expansion devices such as a number of expansion cards and expansion boards are mounted.

What is claimed is:

1. A computer start-up system comprising:
   at least one expansion card mounted on a main body unit of a computer; and
   an initialization executing device for initializing the expansion card by executing, at a time of power-on of the main body unit, an initialization command which is set in accordance with the expansion card; wherein
   the main body unit comprises:
   a common command storing device for storing a common command which is set in advance as an initialization command common to expansion cards performing a same type of operational functions and card types set to be a group by a specified criteria among the expansion cards;
   an execution processing control device for identifying the specific card type of each expansion card at the time of power-on of the main body unit and initializing the expansion cards of the specific card type by executing the common command; and
   a history information storing device for storing card identification information which indicates the expansion card initialized by execution of the common command; wherein
   the execution processing control device includes an initialization execution control function for recognizing the card identification information at each expansion card, allowing the initialization executing device to execute the initialization command stored in advance in the expansion card when the recognized card identification information of each expansion card is not stored in the common command storing device and the history information storing device, and inhibiting the initialization executing device from executing the initialization command when the card identification information is stored in the common command storing device and the history information storing device.

2. The computer start-up system as claimed in claim 1, wherein:
   the execution processing control device has a history information registering function for registering identification information set in advance in each of the expansion cards into the history information storing device when the initialization command of each of the expansion cards is executed.

3. The computer start-up system as claimed in claim 1, wherein
   a mount authentication device for authenticating mounting of each of the expansion cards on the main body unit and judging whether it is necessary to initialize the expansion card which is authenticated to be mounted based on stored content in the history information storing device is added to the execution processing control device.

4. The computer start-up system claimed in claim 1, wherein
   the execution processing control device has the execution processing suppressing function for suppressing execution of the initialization command set in each expansion card which is initialized by execution of the common command.

5. A computer start-up method of executing an initialization of at least one expansion card for a computer start-up system comprising the at least one expansion card mounted on a main body unit of a computer and an initialization executing device for initializing the expansion card by executing, at a time of power-on of the main body unit, an initialization command which is set in accordance with the expansion card,
   wherein the main body unit comprises: a common command storing device for storing a common command which is set in advance as an initialization command common to expansion cards performing a same type of operational function and card types set to be a group by a specific criteria among the expansion cards; an execution processing control device for allowing the initialization executing device to execute the common command; and a history information storing device for storing card identification information which indicates an initialized state of the expand card, the computer start-up method comprising:
   at the time of power-on of the main body unit
   recognizing the card identification information of each expansion card;
   allowing the execution processing control device to execute the initialization command storing in advance in the expansion card when the recognized card identification information of each expansion card is not stored in the common command storing device and the history information storing device; and
   inhibiting the execution processing control device from executing the initialization command when the card identification information is stored in the common command storing device and the history information storing device.

6. A non-transitory computer readable recording medium storing a computer start-up program for executing an initialization of at least one expansion card for a computer start-up system comprising the at least one expansion card mounted on a main body unit of a computer and an initialization executing device for initializing the expansion card by executing, at a time of power-on of the main body unit, an initialization command which is set in accordance with the expansion card, wherein the main body unit comprises: a common command storing device for storing a common command which is set in advance as an initialization command common to expansion cards performing a same type of operational function and card types set to be a group by a specific criteria among the expansion cards; an execution processing control device for allowing the initialization executing device to execute the common command; and a history information storing device for storing card identification information which indicates an initialized state of the expand card, the program causing a computer provided to the main body unit to execute a method comprising:

at the time of power-on of the main body unit, recognizing the card identification information of each expansion card;

allowing the execution processing control device to execute the initialization command storing in advance in the expansion card when the recognized card identification information of each expansion card is not stored in the common command storing device and the history information storing device; and inhibiting the execution processing control device from executing the initialization command when the card identification information is stored in the common command storing device and the history information storing device.

7. A computer start-up system comprising:

at least one expansion card mounted on a main body unit of a computer; and initialization executing means for initializing the expansion card by executing, at a time of power-on of the main body unit, an initialization command which is set in accordance with the expansion card; wherein the main body unit comprises:

common command storing means for storing a common command which is an initialization command common to expansion cards performing a same type of operational functions and card types set to be a group by a specified criteria among the expansion cards;

execution processing control means for identifying the specific card type of each expansion card at the time of power-on of the main body unit and initializing the expansion cards of the specific card type by executing the common command; and history information storing means for storing card identification information which indicates the expansion card initialized by execution of the common command; wherein the execution processing control means includes an initialization execution control function for recognizing the card identification information at each expansion card, allowing the initialization executing device to execute the initialization command stored in advance in the expansion card when the recognized card identification information of each expansion card is not stored in the common command storing device and the history information storing device, and inhibiting the initialization executing device from executing the initialization command when the card identification information is stored in the common command storing device and the history information storing device.

* * * * *